(12) United States Patent
He et al.

(10) Patent No.: US 12,459,474 B2
(45) Date of Patent: Nov. 4, 2025

(54) ELECTRONIC MECHANICAL BRAKE SYSTEM AND VEHICLE

(71) Applicant: Huawei Digital Power Technologies Co., Ltd., Shenzhen (CN)

(72) Inventors: Yuhui He, Shanghai (CN); Jianjun He, Dongguan (CN); Yongjian Wan, Shanghai (CN); Hui Ni, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 599 days.

(21) Appl. No.: 17/868,108

(22) Filed: Jul. 19, 2022

(65) Prior Publication Data
US 2022/0348175 A1 Nov. 3, 2022

(30) Foreign Application Priority Data
Jul. 22, 2021 (CN) .......................... 202110832270.9

(51) Int. Cl.
| | |
|---|---|
| *B60T 8/88* | (2006.01) |
| *B60T 7/04* | (2006.01) |
| *B60T 7/06* | (2006.01) |
| *B60T 8/92* | (2006.01) |
| *B60T 17/22* | (2006.01) |

(52) U.S. Cl.
CPC .............. *B60T 8/885* (2013.01); *B60T 7/042* (2013.01); *B60T 7/06* (2013.01); *B60T 8/92* (2013.01); *B60T 17/22* (2013.01); *B60T 2270/402* (2013.01); *B60T 2270/404* (2013.01); *B60T 2270/406* (2013.01); *B60T 2270/82* (2013.01)

(58) Field of Classification Search
CPC . B60T 8/885; B60T 8/92; B60T 7/042; B60T 7/06; B60T 17/22; B60T 2270/402; B60T 2270/404; B60T 2270/82; B60T 2270/406; B60T 1/005; B60T 8/171; B60T 2220/04; F16D 63/006
See application file for complete search history.

(56) References Cited

U.S. PATENT DOCUMENTS

| | | |
|---|---|---|
| 4,395,883 A | 8/1983 | Melinat |
| 4,658,939 A | 4/1987 | Kircher et al. |
| 6,179,390 B1 | 1/2001 | Guzorek et al. |
| (Continued) | | |

FOREIGN PATENT DOCUMENTS

| | | |
|---|---|---|
| CN | 201457350 U | 5/2010 |
| CN | 203651744 U | 6/2014 |
| (Continued) | | |

*Primary Examiner* — Pamela Rodriguez
(74) *Attorney, Agent, or Firm* — Maier & Maier, PLLC

(57) ABSTRACT

An electronic mechanical brake system and a vehicle. The electronic mechanical brake system includes a brake pedal, an electronic brake mechanism, a mechanical brake mechanism, a brake, and a switch mechanism with a first state and a second state. The electronic brake mechanism includes a controller and an electronic signal sensor. The controller, the electronic signal sensor, and the brake are electrically connected. When the switch mechanism is in the first state, the electronic signal sensor is configured to receive a braking signal of the brake pedal and transmit the braking signal to the controller. The controller controls the brake to brake based on the braking signal. The electronic mechanical brake system can improve driving safety. In addition, reliability of the mechanical brake system is high, and costs are low.

18 Claims, 5 Drawing Sheets

(56) References Cited

U.S. PATENT DOCUMENTS

2006/0163941 A1     7/2006   Von Hayn et al.
2013/0113271 A1     5/2013   Von Hayn et al.

FOREIGN PATENT DOCUMENTS

| | | |
|---|---|---|
| CN | 104859622 A | 8/2015 |
| CN | 109987075 A | 7/2019 |
| CN | 111252052 A | 6/2020 |
| JP | 2017088048 A | 5/2017 |
| JP | 2017088055 A | 5/2017 |
| WO | 2006111392 A1 | 10/2006 |
| WO | 2009152981 A1 | 12/2009 |

ELECTRONIC MECHANICAL BRAKE SYSTEM AND VEHICLE

CROSS-REFERENCE TO RELATED APPLICATIONS

This application claims priority to Chinese Patent Application No. 202110832270.9, filed on Jul. 22, 2021, the disclosure of which is hereby incorporated by reference in its entirety.

TECHNICAL FIELD

The embodiments relate to the field of braking technologies, an electronic mechanical brake system, and a vehicle.

BACKGROUND

A brake system, as one of important parts of a vehicle, is directly related to overall performance of the vehicle and security of life and property. The brake system is generally divided into mechanical-only braking and electronic mechanical braking. The electronic mechanical braking is to press against a brake disc tightly by using a power source from a motor acting on the system, to generate required braking force.

Currently, a vehicle is generally braked by using electronic mechanical braking only or is braked by using electronic mechanical braking and hydraulic backup braking. When the vehicle is braked by using electronic mechanical braking only, if the electronic mechanical braking fails, a serious safety problem may occur. However, due to a sealing requirement of a hydraulic system, the vehicle braked by using electronic mechanical braking and hydraulic backup braking may have a complicated mechanical structure, leading to low reliability. In addition, regular maintenance and brake fluid replacement are required, resulting in high costs.

SUMMARY

The embodiments provides an electronic mechanical brake system and a vehicle, where the electronic mechanical brake system and a mechanical brake system are combined. This can improve driving safety and provide a high-reliability mechanical brake system with low costs.

According to a first aspect, the embodiments may provide an electronic mechanical brake system, including a brake pedal, a mechanical brake mechanism, an electronic brake mechanism, a brake and a switch mechanism having a first state and a second state. The switch mechanism is in the first state when the electronic brake mechanism works properly, and the switch mechanism is in the second state when the electronic brake mechanism fails. The electronic brake mechanism includes a controller and an electronic signal sensor. The controller is connected to the electronic signal sensor and the brake. When the switch mechanism is in the first state, the electronic signal sensor may receive a braking signal of the brake pedal and transmit the received braking signal to the controller, and the controller may control the brake to brake based on the braking signal. When the electronic brake mechanism fails, the switch mechanism may switch to the second state. A transmission assembly of the mechanical brake mechanism may be in transmission connection to the brake pedal, and an actuator of the mechanical brake mechanism is connected to the transmission assembly and the brake, to actuate the brake to brake. Due to the mechanical brake mechanism and the electronic mechanical brake system, when an electrical system works properly, the electronic brake mechanism may work properly, and receive the braking signal of the brake pedal, so that the controller controls the brake to brake. When the electrical system cannot work properly, and the electronic brake mechanism fails, the transmission assembly of the mechanical brake mechanism may be connected to the brake pedal, and the actuator connected to the transmission assembly may be connected to the brake, to actuate the brake to brake. In view of this, the electronic mechanical brake system and the mechanical brake system can respectively control the brake to brake when the electrical system works properly and when the electrical system cannot work properly, to improve safety. In addition, no hydraulic mechanism is included in the mechanical brake system, so that a stepped piston, an oil circuit, or the like may not be disposed. This can reduce structure complexity.

In an embodiment, the electronic mechanical brake system may further include a feedback mechanism. When the electrical system works properly, and the switch mechanism is in the first state, the feedback mechanism may be in transmission connection to the brake pedal. When the brake pedal is subject to braking force applied by a driver, the feedback mechanism may generate braking force similar to that of the brake, and feed the force back to the driver, to improve experience of the driver.

In the foregoing embodiment, the switch mechanism may include a housing, a first sliding block, a double-sided ratchet, and an electromagnetic switch assembly. A sliding groove used for the first sliding block to slide in a first direction is disposed on the housing. A first end of the first sliding block is connected to the brake pedal by using a connecting rod, and a second end of the first sliding block is connected to a first end of the double-sided ratchet. A first side and a second side of the double-sided ratchet are respectively configured to be connected to the feedback mechanism and the transmission assembly. A first end of the electromagnetic switch assembly is connected to the first sliding block, and a second end of the electromagnetic switch assembly is connected to the double-sided ratchet. When the electrical system works properly, and the switch mechanism is in the first state, the brake pedal may drive the first sliding block to slide in the first direction by using the connecting rod, and the electromagnetic switch assembly may connect the double-sided ratchet connected to the first sliding block to the feedback mechanism, to provide feedback force for the driver. When the electrical system cannot work properly, and the switch mechanism is in the second state, the brake pedal may drive the first sliding block to slide in the first direction by using the connecting rod, the electromagnetic switch assembly may connect the double-sided ratchet connected to the first sliding block to the transmission assembly, the transmission assembly may drive the actuator, and the actuator may actuate the brake to brake, to ensure safety.

The electromagnetic switch assembly may include an electromagnet, a positioning block, a metal drive rod and a first elastic part. The positioning block is fastened to the first sliding block, and the electromagnet is connected to an end of the positioning block away from the first sliding block. The electromagnet is located at the second side of the double-sided ratchet. A gap for accommodating a first end of the metal drive rod exists between the electromagnet and the positioning block, and a second end of the metal drive rod may be connected to the double-sided ratchet. A first end of the first elastic part is connected to the first sliding block, and a second end of the first elastic part is connected to the second side of the double-sided ratchet. When the electrical system works properly, and the switch mechanism is in the first state, the controller may control a set current to pass through the electromagnet, so that the electromagnet is magnetic, and attracts the first end of the metal drive rod. In view of this, the second end of the metal drive rod can drive the double-sided ratchet to move towards the first side of the double-sided ratchet, and to be connected to the feedback mechanism. When the electrical system cannot work properly, and the switch mechanism is in the second state, the first elastic part is in a force accumulation state and pulls the double-sided ratchet to connect the second side of the double-sided ratchet to the transmission assembly, to ensure that the brake can brake.

It should be noted that the first elastic part may be a coil spring.

In an embodiment, the brake may include a motor, a reducer, and a brake assembly. The motor is connected to the controller. An output shaft of the motor is in transmission connection to the reducer, and an output shaft of the reducer is connected to the brake assembly and the actuator. When the electrical system works properly, after receiving the braking signal, the controller may control the motor to work, and the motor controls the brake assembly to brake by using the reducer.

It should be noted that the brake assembly may include a ball screw, a friction sheet, and a friction disc. The ball screw may be connected to the output shaft of the reducer and drive the friction sheet to tightly press against the friction disc for braking.

In an embodiment, the transmission assembly may include a first reel, a first gear, a first rack, a cable, and a first rotating shaft. The first gear may be fastened to the first reel, the first gear and the first reel are coaxially disposed. The first rotating shaft passes through the first gear and the first reel, so that the first gear and the first reel are rotatably disposed on the housing. The first gear is engaged with a first side of the first rack, and a second side of the first rack may be engaged with the second side of the double-sided ratchet. A first end of the cable may be fixedly disposed on the first reel, and a second end of the cable may be connected to the actuator. When the electrical system cannot work properly, and the switch mechanism is in the second state, the double-sided ratchet may drive the first rack to move in the first direction, and the first rack may drive the first gear to rotate. The first gear may drive the first reel to rotate, and the first reel may drive the cable to be coiled on the first reel. In this case, the cable may drive the actuator to move, to control the brake to brake.

The actuator may have various structures. For example, the actuator includes a fixed shell, a ratchet wheel, a drive plate, a second sliding block, a second elastic part, and a second rotating shaft. The fixed shell may be fixedly disposed at a side of the output shaft of the reducer, and the ratchet wheel is connected to the output shaft of the reducer. In addition, a gap exists between an outer profile of the ratchet wheel and the fixed shell, and the gap forms a mounting channel used to mount the second sliding block. A first end of the second sliding block may be connected to a first end of the second elastic part, and a second end of the second elastic part may be fastened to the fixed shell. The drive plate may have a first end, a second end, and a third end. The second rotating shaft may be connected to the second sliding block through the first end of the drive plate, and the second rotating shaft is located at one end of the second sliding block close to the second elastic part. The second end of the drive plate is connected to a cable, and the second end of the drive plate is disposed at a side away from the ratchet wheel. The third end of the drive plate is away from the first end and the second end, and the third end has a ratchet for cooperating with the ratchet wheel. When the cable is coiled on the first reel, the cable may pull the drive plate to move to a position at which the ratchet wheel is located, so that the ratchet on the drive plate cooperates with the ratchet wheel. As the cable is coiled, the cable may drive the ratchet wheel to rotate, and drive the output shaft of the reducer connected to the ratchet wheel to rotate, to control the brake assembly to brake.

It should be noted that the second elastic part may be a tension spring. When the cable pulls the drive plate to enable the ratchet on the drive plate to cooperate with the ratchet wheel and continues to pull the drive plate to drive the ratchet wheel to rotate, the drive plate stretches the second elastic part to store energy. When braking stops, the second elastic part may pull the drive plate to an initial position. When the drive plate is in the initial position, the ratchet of the drive plate does not cooperate with the ratchet wheel, so that the reducer can work stably.

In the foregoing embodiment, the actuator may further include a third elastic part. A first end of the third elastic part may be connected to the drive plate, and a second end of the third elastic part may be connected to the first end of the second sliding block. The third elastic part is between the second rotating shaft and the ratchet wheel, and the third elastic part is in contact with the second rotating shaft. The second rotating shaft keeps tightly pressing against the third elastic part, so that the third elastic part provides force to keep the second rotating shaft away from the ratchet wheel. Therefore, when the switch mechanism is in the first state, the ratchet on the drive plate is not in contact with the ratchet wheel, to ensure that the output shaft of the reducer controls the brake assembly to brake without interference, so that an anti-lock brake system or an electronic stability controller does not have an uncontrollable area on a low-traction road surface.

The actuator may further include a fourth elastic part and a position-limiting plate. The cable may be connected to the drive plate through the position-limiting plate. The fourth elastic part is sleeved on the cable and located between the position-limiting plate and the drive plate. When the cable is coiled on the first reel, the fourth elastic part is compressed by force. When the cable stops being coiled on the first reel, the fourth elastic part provides force for restoring the cable to an initial state.

It should be noted that the third elastic part may be a rotary spring, and the fourth elastic part may be a tension spring.

The actuator may further include a first ratchet disc, a second ratchet disc, and a fifth elastic part. A flange that can be connected to the output shaft of the reducer is disposed on the second ratchet disc, and the flange is coaxially disposed with the second ratchet disc. The flange protrudes from a side of the second ratchet disc away from the reducer. The first ratchet disc is also sleeved on the output shaft of the reducer. The fifth elastic part may be disposed between the first ratchet disc and the second ratchet disc to connect the first ratchet disc to the second ratchet disc. In addition, a guide mechanism is disposed between the first ratchet disc and the second ratchet disc, and the guide mechanism may connect the first ratchet disc to the second ratchet disc. In an implementation, the first ratchet disc is connected to the cable. When the electrical system cannot work properly, and the switch mechanism is in the second state, the cable is coiled on the first reel. The cable pulls the first ratchet disc, so that the first ratchet disc rotates relative to the second ratchet disc, and the first ratchet disc gradually moves towards a position at which the second ratchet disc is located, to engage the first ratchet disposed on a side of the first ratchet disc with the second ratchet disposed on a side of the second ratchet disc, drive the second ratchet disc to rotate, further drive the output shaft of the reducer to rotate, and control the brake assembly to brake.

The guide mechanism may include a guide groove disposed on a side wall of the flange. The guide groove is in a spiral shape. The guide mechanism may further include a guide ball disposed on an inner wall of a through hole of the first ratchet disc. The guide ball may be disposed in the guide groove. When the cable pulls the first ratchet disc, the guide ball may slide in an extension direction of the guide groove, to drive the first ratchet disc to move towards the position at which the second ratchet disc is located and engage the first ratchet on a side of the first ratchet disc with the second ratchet on a side of the second ratchet disc, drive the second ratchet disc to rotate, and implement braking of the brake assembly.

In addition, to facilitate connection between the cable and the first ratchet disc, a mounting ear may be disposed on the first ratchet disc, an opening may be disposed in the mounting ear, and the cable is connected to the first ratchet disc by using the opening.

It should be noted that the fifth elastic part may be a spring. The first ratchet disc is not in contact with the output shaft of the reducer.

In an embodiment, the feedback mechanism may include a second rack, a second gear, a second reel, and a third rotating shaft. The second gear and the second reel may be coaxially disposed, and the third rotating shaft may connect the second gear and the second reel to the housing. Two sides of the second rack may be respectively connected to the second gear and the double-sided ratchet. When the electrical system works properly, and the switch mechanism 2 is in the first state, the double-sided ratchet is engaged with the second gear, to drive the second gear and the second reel.

According to a second aspect, the embodiments may further provide a vehicle, and the mobile terminal may have the electronic mechanical brake system in any one of the foregoing solutions. The electronic mechanical brake system provided in the first aspect can improve driving safety performance and reduce costs. Therefore, a vehicle having the electronic mechanical brake system also has a same effect. Details are not described herein again.

DETAILED DESCRIPTION OF THE EMBODIMENTS

To make objectives, solutions, and advantages clearer, the following further describes the embodiments in detail with reference to accompanying drawings.

To improve driving safety, a hydraulic brake system may be added on the basis of electronic mechanical braking, so that the hydraulic brake system and the electronic mechanical system can work together during driving braking. However, because an electronic mechanical brake mechanism cannot interfere with the hydraulic system, on a low-traction road surface, such as an icy surface or a wet ceramic tile surface, braking force on a wheel may not be fully released, and the wheel locks, which causes danger. In addition, the hydraulic system has a high demand for sealing, which leads to a complicated mechanical structure and costs increase.

Terms used in the embodiments are merely intended to describe embodiments but are not intended to limit the embodiments. Terms "one", "a", "the", "the foregoing", "this", and "the one" of singular forms used in the embodiments are also intended to include plural forms like "one or more", unless otherwise specified in the context clearly.

Reference to "one embodiment" or "some embodiments" or the like means that one or more embodiments include a particular feature, structure, or characteristic described in combination with the embodiment. Thus, phrases "in one embodiment", "in some embodiments", "in some other embodiments", "in some additional embodiments", and the like do not necessarily mean referring to the same embodiment, but mean "one or more embodiments, but not all embodiments", unless otherwise emphasized. The terms "include", "have", and their variants all mean "include but are not limited to", unless otherwise emphasized in other ways.

Figure 1:
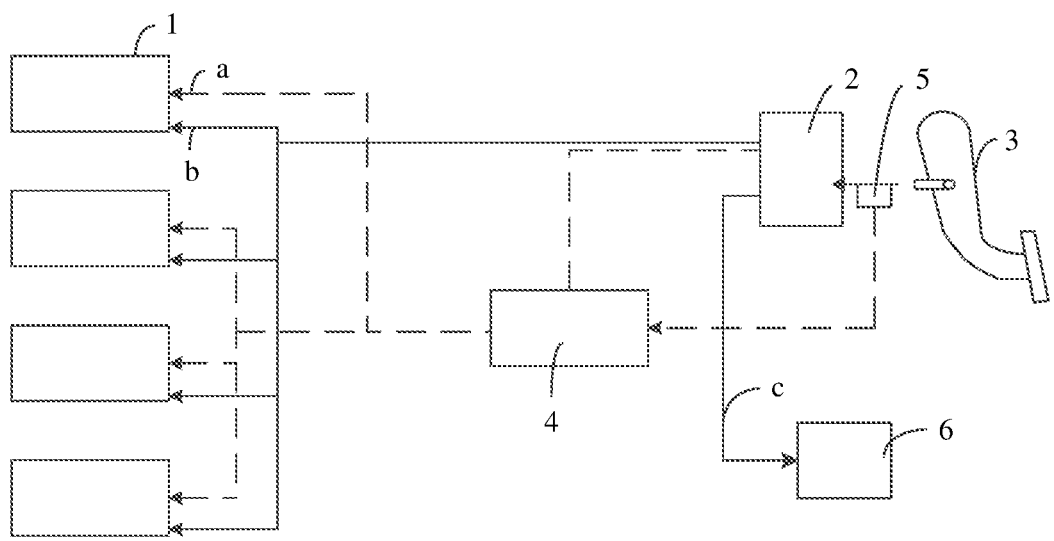
FIG. 1 is a schematic diagram of a structure of an electronic mechanical brake system according to an embodiment.

In FIG. 1, a dashed line a is a transmission path of an electronic brake mechanism, a solid line b is a transmission path of a mechanical brake mechanism, and a solid line c is a transmission path of a feedback mechanism. Refer to FIG. 1. The embodiments may provide an electronic mechanical brake system, including a brake pedal 3, the electronic brake mechanism, the mechanical brake mechanism, a brake 1, and a switch mechanism 2. The electronic brake mechanism may include a controller 4 and an electronic signal sensor 5. The mechanical brake mechanism may include a transmission assembly and an actuator. The switch mechanism 2 has a first state and a second state. When the electronic brake mechanism works properly, the switch mechanism 2 is in the first state. When the electronic brake mechanism cannot work properly, the switch mechanism 2 is in the second state. When the switch mechanism 2 is in the first state, the electronic signal sensor 5 may receive a braking signal of the brake pedal 3 and may transmit the braking signal to the controller 4, so that the controller 4 can control the brake 1 to brake based on the braking signal. When the switch mechanism 2 is in the second state, the brake pedal 3 may be connected to the transmission assembly, the actuator is connected to the brake pedal 3 by using the transmission assembly, and the actuator is further connected to the brake 1, to actuate the brake 1 to brake. In an actual application, the electronic brake mechanism and the mechanical brake mechanism may be separately connected to the brake pedal 3 and the brake 1 when the switch mechanism 2 is in the first state and the second state, so that the electronic brake mechanism can brake a vehicle when an electrical system works properly (the switch mechanism 2 is in the first state), and the mechanical brake mechanism can brake the vehicle when the electrical system cannot work properly (the switch mechanism 2 is in the second state), to ensure driving safety performance. In addition, no hydraulic structure is included in the mechanical brake system, so that a structure such as a stepped piston or an oil circuit may not be disposed in the electronic mechanical brake system. This can reduce complexity of a structure of the electronic mechanical brake system, and further reduce costs of the electronic mechanical brake system.

Figure 2:
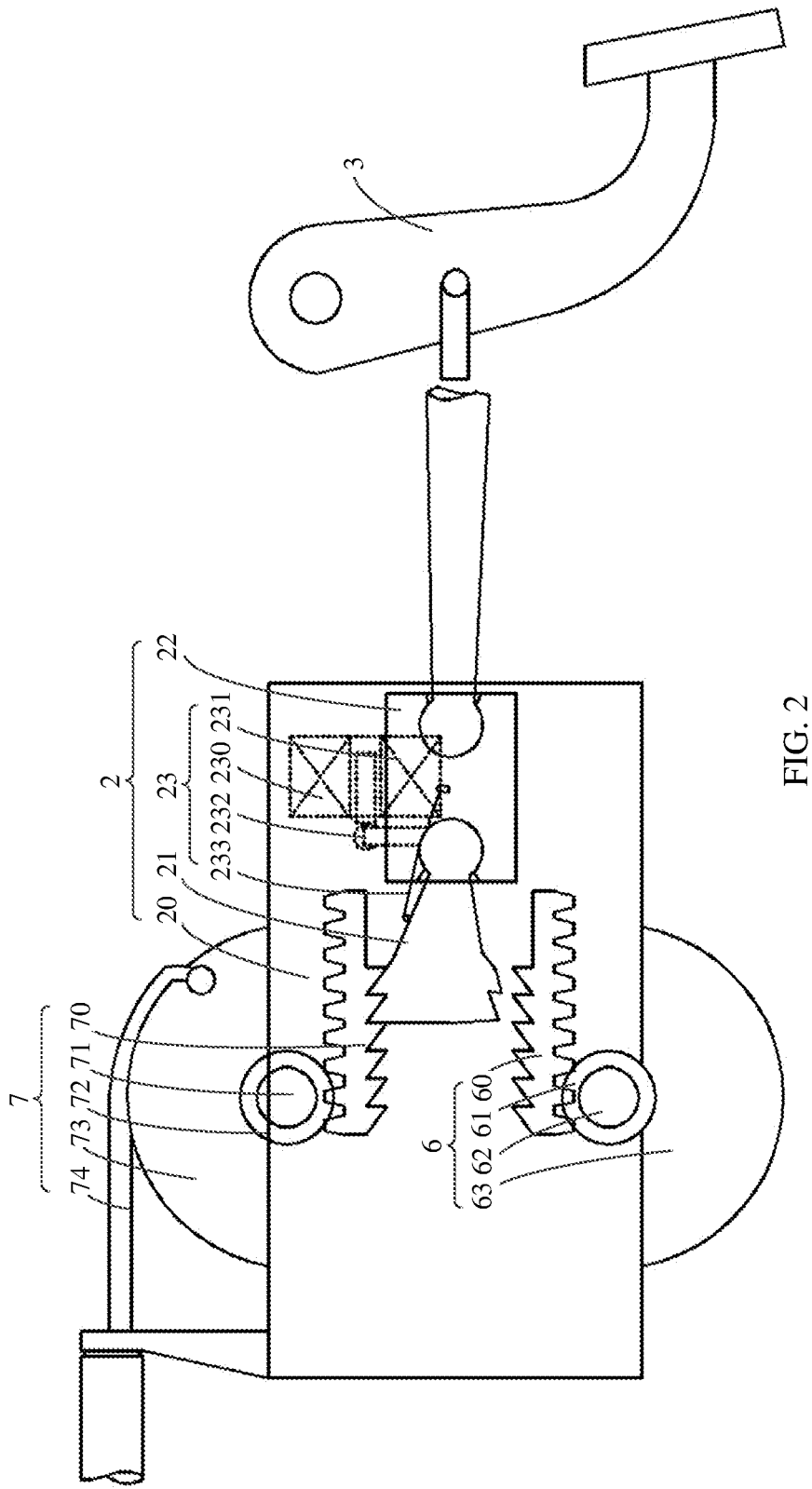
FIG. 2 is a schematic diagram of a structure of a switch mechanism, a feedback mechanism, and a transmission assembly in an electronic mechanical brake system according to an embodiment.

As shown in FIG. 2, in an embodiment, when the electrical system works properly, and the switch mechanism 2 is in the first state, the electronic brake mechanism may control the brake to brake. In this case, to improve experience and fidelity when a driver steps on the brake pedal 3, the electronic mechanical brake system may further include the feedback mechanism 6. The feedback mechanism 6 may be connected to the brake pedal 3 when the switch mechanism 2 is in the first state, and when the driver steps on the brake pedal, the feedback mechanism 6 may generate force similar to braking force to improve experience and fidelity of the driver.

In the foregoing embodiment, the switch mechanism may include a housing 20, a double-sided ratchet 21, a first sliding block 22, and an electromagnetic switch assembly 23. A sliding groove may be disposed in a first direction of the housing 20. The first sliding block 22 is disposed in the sliding groove. A first end of the first sliding block 22 may be connected to the brake pedal 3 by using a connecting rod or a push rod, and a second end of the first sliding block 22 is connected to a first end of the double-sided ratchet 21. A first side of the double-sided ratchet 21 may be connected to the transmission assembly 7, and a second side of the double-sided ratchet 21 may be connected to the feedback mechanism 6. A first end of the electromagnetic switch assembly 23 may be disposed on the first sliding block 22, and a second end of the electromagnetic switch assembly 23 may be disposed on the double-sided ratchet 21. When the electrical system works properly (the electronic brake mechanism works properly), and the switch mechanism 2 is in the first state, the brake pedal 3 is subject to pedaling force, and the first sliding block 22 connected to the connecting rod or the push rod is subject to force of the brake pedal 3 and slides in the sliding groove in the first direction. The first sliding block 22 may drive the double-sided ratchet 21 to also slide in the first direction. When the first sliding block 22 drives the double-sided ratchet 21 to slide in the first direction, the electromagnetic switch assembly 23, controlled by the electronic brake mechanism, may connect the double-sided ratchet 21 to the feedback mechanism 6, so that the double-sided ratchet 21 drives the feedback mechanism 6 to work and provide feedback force for the driver. When the electrical cannot work properly (the electronic brake mechanism fails), the brake pedal 3 is subject to pedaling force, and the first sliding block 22 connected to the connecting rod or the push rod is subject to force of the brake pedal 3 and slides in the sliding groove in the first direction. The first sliding block 22 may also drive the double-sided ratchet 21 to slide in the first direction. When the first sliding block 22 drives the double-sided ratchet 21 to slide in the first direction, the double-sided ratchet 21, driven by the electromagnetic switch assembly, may be connected to the transmission assembly 7. The transmission assembly 7 may drive the actuator, and the actuator may actuate the brake to brake, to ensure driving safety.

As shown in FIG. 2, a structure of the electromagnetic switch assembly 23 may include an electromagnet 230, a positioning block 231, a metal drive rod 232, and a first elastic part 233. The controller in the electronic brake mechanism may control a current passing through the electromagnet 230. The positioning block 231 is disposed on the first sliding block 22. The electromagnet 230 is connected to an end of the positioning block 231 away from the first sliding block 22, and the electromagnet 230 is located at the second side of the double-sided ratchet 21. A gap for accommodating a first end of the metal drive rod 232 exists between the electromagnet 230 and the positioning block 231, and a second end of the metal drive rod 232 may be connected to the double-sided ratchet 21. When the electrical system works properly (the electronic brake mechanism works properly), and the switch mechanism 2 is in the first state, the controller may control a set current to pass through the electromagnet, so that the electromagnet 230 is magnetic, and attracts the first end of the metal drive rod 232, and the second end of the metal drive rod 232 can drive the double-sided ratchet 21 to move towards the first side of the double-sided ratchet 21. In addition, the first side of the double-sided ratchet 21 is connected to the feedback mechanism 6, so that the feedback mechanism 6 feeds back force to the driver. In addition, two ends of the first elastic part 233 are respectively connected to the first sliding block 22 and the second side of the double-sided ratchet 21, and the first elastic part 233 remains in a force accumulation state, to pull the double-sided ratchet 21. Therefore, when the electrical system cannot work properly (the electronic brake mechanism fails), the first elastic part 233 can pull the double-sided ratchet 21 to connect the second side of the double-sided ratchet 21 to the transmission assembly, to ensure that the brake can brake. In addition, because the first elastic part 233 is disposed, after each time the electronic brake mechanism brakes, the first elastic part 233 may restore the double-sided ratchet 21 to an initial state.

In an embodiment, the transmission assembly 7 may include a first reel 73, a first gear 72, a first rack 70, a cable 74, and a first rotating shaft 71. The first gear 72 and the first reel 73 may be coaxially disposed, and the first gear 72 may be fastened to the first reel 73. The first gear 72 and the first reel 73 are rotatably connected to the housing 20 by using the first rotating shaft 71. The first gear 72 may be engaged with the second side of the double-sided ratchet 21. One end of the cable 74 may be connected to the first reel 73, and another end of the cable 74 may be connected to the actuator. When the electrical system cannot work properly (the electronic brake mechanism fails), and the switch mechanism 2 is in the second state, the double-sided ratchet 21 may drive the first rack 70 to move in the first direction. The first rack 70 may drive the first gear 72 to rotate. The first gear 72 may drive the first reel 73 to rotate clockwise. When the first reel 73 rotates clockwise, the cable 74 may be coiled on the first reel 73. In this case, the cable 74 may pull the actuator, so that the controller controls the brake to brake.

In an embodiment, the feedback mechanism 6 may include a second rack 60, a second gear 61, a second reel 63, and a third rotating shaft 62. The second gear 61 and the second reel 63 may be coaxially disposed, and the third rotating shaft 62 may pass through the second gear 61 and the second reel 63 to connect the second gear 61 and the second reel 63 to the housing 20. The second rack 60 may be connected to the double-sided ratchet 21. When the electrical system works properly (the electronic brake mechanism works properly), and the switch mechanism 2 is in the first state, the switch mechanism 2 drives the double-sided ratchet 21 to engage the double-sided ratchet 21 with the second rack 60, to drive the second gear 61 and the second reel 63 and provide feedback for the driver. This improves experience and fidelity of the driver.

Figure 3:
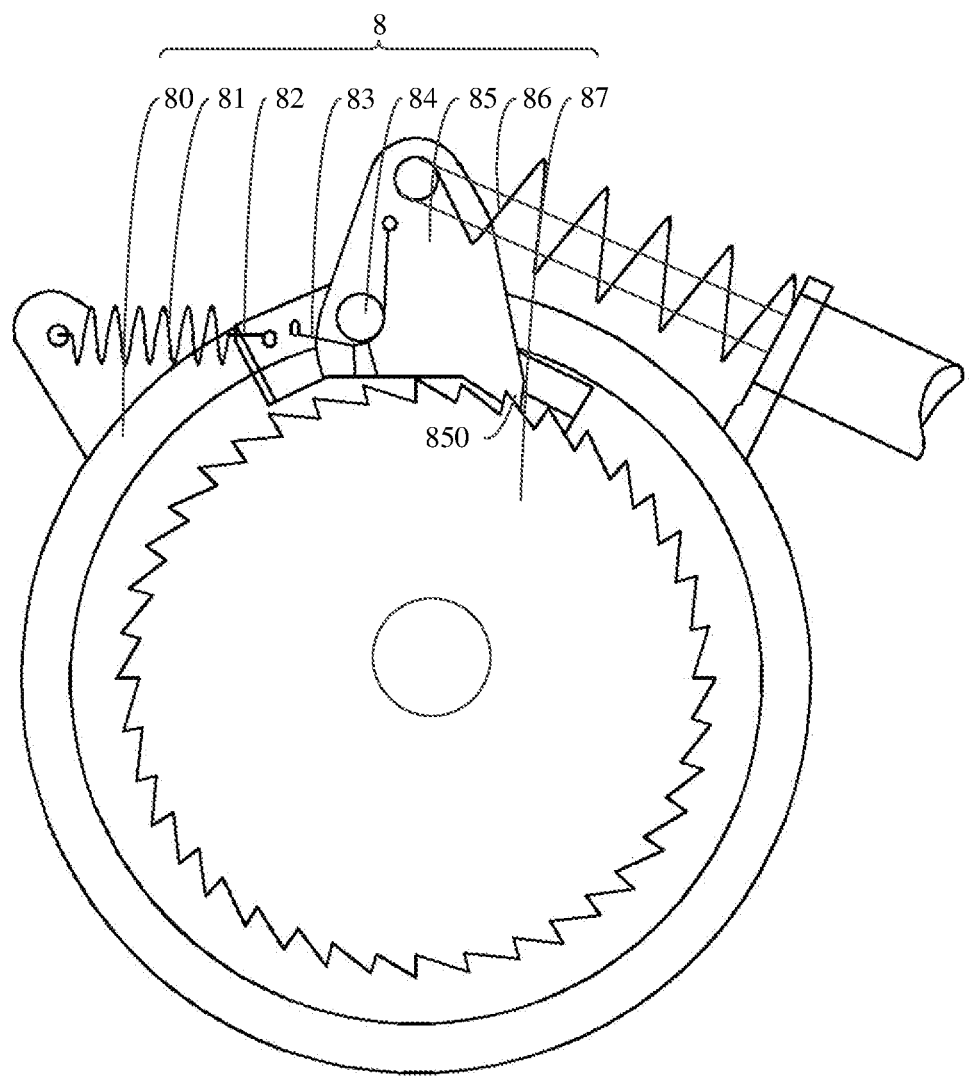
FIG. 3 is a schematic diagram of a structure of an actuator of an electronic mechanical brake system according to an embodiment.

As shown in FIG. 3, in the foregoing embodiments, the actuator 8 may have various structures. For example, the actuator 8 may include a fixed shell 80, a ratchet wheel 87, a drive plate 85, a second sliding block 82, a second elastic part 81, and a second rotating shaft 84. The fixed shell 80 is fixedly disposed at a side of an output shaft of a reducer of the brake, and the ratchet wheel 87 may be disposed on the output shaft of the reducer. A mounting channel used to mount the second sliding block is formed between an outer profile of the ratchet wheel 87 and an inner wall of the fixed shell 80. A first end of the second sliding block 82 may be connected to a first end of the second elastic part 81, and a second end of the second sliding block 82 may be fastened to the fixed shell 80. The drive plate 85 may have a first end, a second end, and a third end. The second rotating shaft 84 may be connected to the second sliding block 82 through the first end of the drive plate 85, and the second rotating shaft 84 is located at one end of the second sliding block 82 connected to the second elastic part 81. The second end of the drive plate 85 is connected to the cable, and the second end of the drive plate 85 is disposed at a side away from the ratchet wheel 87. The third end of the drive plate 85 is away from the first end and the second end, and the third end has a ratchet 850 for cooperating with the ratchet wheel 87. When the electrical system cannot work properly (the electronic brake mechanism fails), the switch mechanism 2 is in the second state, and the cable is coiled on the first reel, the cable may pull the drive plate 85 to engage the ratchet 850 on the drive plate 85 with the ratchet wheel 87. As the cable continues to pull the drive plate 85, the drive plate 85 may drive the ratchet wheel 87 to rotate, and the ratchet wheel 87 may drive the output shaft of the reducer to rotate, to control a brake assembly to brake.

It should be noted that, when the cable pulls the drive plate 85, the second elastic part 81 is also stretched by the drive plate 85, so that the second elastic part 81 is in an energy accumulation state. When a braking process stops, the second elastic part 81 may pull the drive plate 85 to an initial position of the drive plate 85. In addition, when the drive plate 85 is in the initial position, the ratchet 850 on the drive plate 85 does not cooperate with the ratchet wheel 87, to ensure that the output shaft of the reducer is not disturbed during braking of the brake assembly, so that an anti-lock brake system or an electronic stability controller does not have an uncontrollable area on a low-traction road surface.

The actuator may further include a third elastic part 83 and a fourth elastic part 86. A first end of the third elastic part 83 may be connected to the drive plate 85, and a second end of the third elastic part 83 may be connected to the first end of the second sliding block 82. The second rotating shaft 84 is located on an extension path of the third elastic part 83, and the second rotating shaft 84 may keep tightly pressing against the third elastic part 83, so that the third elastic part 83 provides force to keep the second rotating shaft 84 away from the ratchet wheel 87. Therefore, when the electrical system works properly (the electronic brake mechanism works properly), and the switch mechanism 2 is in the first state, the ratchet 850 on the drive plate 85 is not in contact with the ratchet wheel 87, to ensure that the output shaft of the reducer controls the brake assembly to brake without interference, so that the anti-lock brake system or the electronic stability controller does not have an uncontrollable area on a low-traction road surface.

To quickly restore the drive plate 85 and the cable to an initial state after braking, the actuator 8 may further include a position-limiting plate. The cable may be connected to the drive plate 85 through the position-limiting plate. The fourth elastic part 86 is disposed between the position-limiting plate and the drive plate 85. When the cable is coiled on the first reel, the fourth elastic part 86 is compressed by force. When the cable stops being coiled on the first reel, the fourth elastic part 86 provides force for restoring the cable and the drive plate 85 to the initial state.

It should be noted that the first elastic part, the second elastic part, the third elastic part, and the fourth elastic part in the foregoing embodiments may all be springs, and there may be a plurality of forms of the springs. This is not limited herein.

Figure 4:
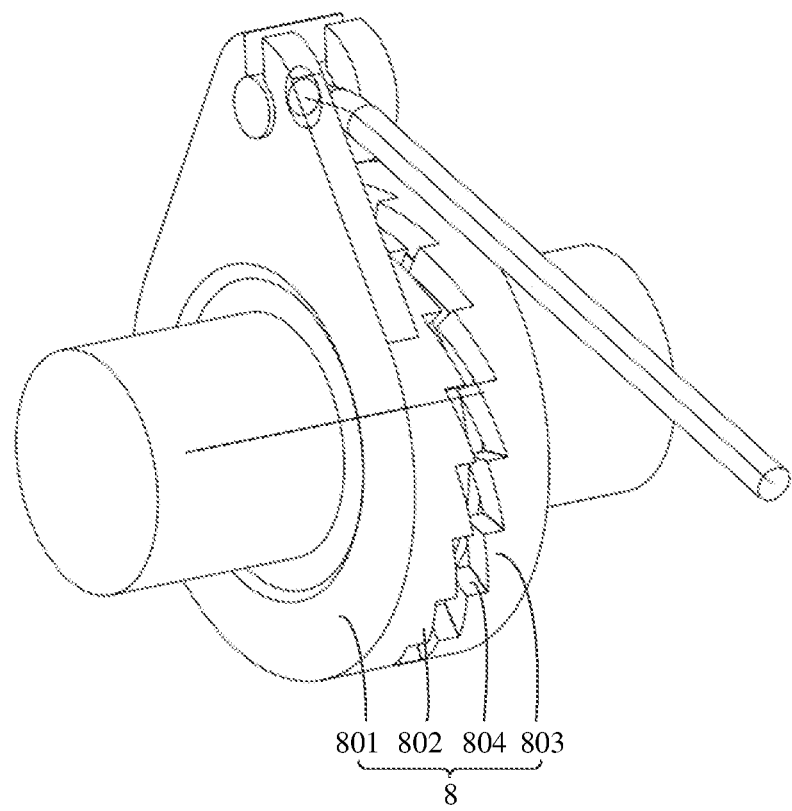
FIG. 4 is a schematic diagram of another structure of an actuator of an electronic mechanical brake system according to an embodiment.
Figure 5:
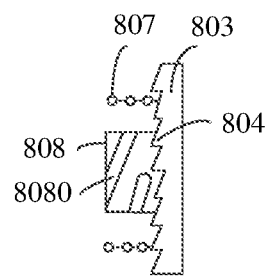
FIG. 5 is a side view of a second ratchet disc in FIG. 4.

In an embodiment, FIG. 4 is a schematic diagram of another structure of the actuator. FIG. 5 is a side view of a second ratchet disc in FIG. 4. The actuator 8 may further include a first ratchet disc 801, the second ratchet disc 803, a fifth elastic part 807, and a guide mechanism. A flange 808 is coaxially disposed with the second ratchet disc 803 on the second ratchet disc 803, and the flange 808 can be connected to the output shaft of the reducer, so that the second ratchet disc 803 is connected to the output shaft of the reducer. The first ratchet disc 801 is also disposed on the output shaft of the reducer. The first ratchet disc 801 and the second ratchet disc 803 may be connected by using the fifth elastic part 807 and the guide mechanism, and the first ratchet disc 801 can be connected to the cable. When the electrical system works properly (the electronic brake mechanism works properly), and the switch mechanism is in the first state, the first ratchet disc 801 is not in contact with the output shaft of the reducer, so that the actuator 8 does not affect proper working of the brake assembly when the switch mechanism is in the first state. When the electrical system cannot work properly, and the switch mechanism 2 is in the second state, the cable is coiled on the first reel. The cable pulls the first ratchet disc 801, so that the first ratchet disc 801 rotates relative to the second ratchet disc 803 by using the guide mechanism, and the first ratchet disc 801 gradually moves towards a position at which the second ratchet disc 803 is located, to engage the first ratchet 802 disposed on a side of the first ratchet disc 801 with the second ratchet 804 disposed on a side of the second ratchet disc 803. As the cable continues to be pulled, the second ratchet disc 803 may be driven to rotate, to drive the output shaft of the reducer to rotate and control the brake assembly to brake.

Figure 6:
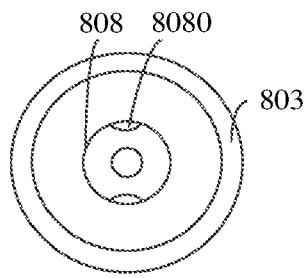
FIG. 6 is a main view of the second ratchet disc in FIG. 4.
Figure 7:
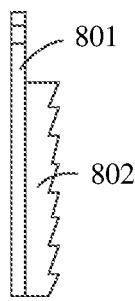
FIG. 7 is a side view of a first ratchet disc in FIG. 4.
Figure 8:
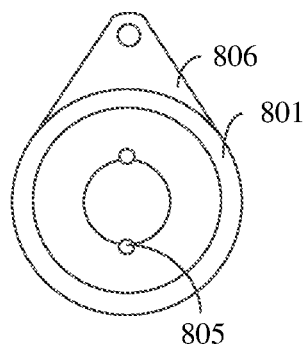
FIG. 8 is a main view of the first ratchet disc in FIG. 4.

It should be noted that FIG. 6 is a main view of the second ratchet disc in FIG. 4, FIG. 7 is a side view of the first ratchet disc in FIG. 4, and FIG. 8 is a main view of the first ratchet disc in FIG. 4. Refer to FIG. 4 to FIG. 8. The guide mechanism may include a guide ball 805 disposed on an inner wall of a through hole of the first ratchet disc 801, and a guide groove 8080 disposed on an outer side of a side wall of the flange 808. The guide groove 8080 may be in a spiral shape, and the guide ball 805 may cooperate with the guide groove 8080. When the cable pulls the first ratchet disc 801, the guide ball 805 may slide in an extension direction of the guide groove 8080, to drive the first ratchet disc 801 to move towards a side close to the second ratchet disc 803, engage the first ratchet 802 on the side of the first ratchet disc 801 with the second ratchet 804 on the side of the second ratchet disc 803, drive the second ratchet disc 803 to rotate, and implement braking of the brake assembly. When the first ratchet disc 801 moves towards a side close to the second ratchet disc 803, the fifth elastic part 807 may be pressed tightly, so that after braking is completed, the first ratchet disc 801 may be restored to an initial position of the first ratchet disc 801 under an action of the fifth elastic part 807.

It should be noted that a mounting ear 806 may be disposed on the first ratchet disc 801, an opening may be disposed in the mounting ear 806, and the cable is connected to the first ratchet disc 801 through the opening. The mounting ear 806 may improve convenience of connecting the cable to the first ratchet disc. In addition, the fifth elastic part 807 may be a spring.

Figure 9:
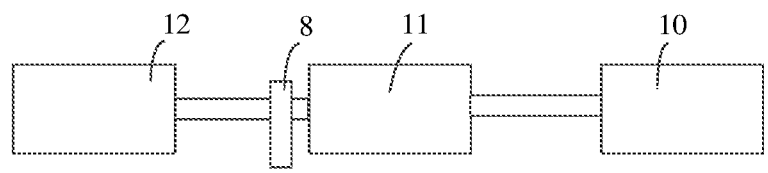
FIG. 9 is a schematic diagram of a structure of a brake of an electronic mechanical brake system according to an embodiment.

As shown in FIG. 9, in the foregoing embodiments, the brake 1 may include a motor 10, the reducer 11 and the brake assembly 12. The motor 10 is connected to the controller. An output shaft of the motor 10 is in transmission connection to the reducer 11, and the output shaft of the reducer 11 is connected to the brake assembly 12. When the electrical system works properly, after receiving the braking signal, the controller may control the motor 10 to work, and the motor 10 controls the brake assembly 12 to brake by using the reducer 11.

It should be noted that the brake assembly may include a ball screw, a friction sheet, and a friction disc. The ball screw may be connected to the output shaft of the reducer and drive the friction sheet to tightly press against the friction disc for braking. In addition, the brake assembly may also include another structure. This is not limited herein.

The embodiments may further provide a vehicle, and the mobile terminal may have the electronic mechanical brake system in any one of the foregoing solutions. The electronic mechanical brake system provided in the first aspect can improve safety performance and reduce costs. Therefore, a vehicle having the electronic mechanical brake system also has a same effect. Details are not described herein again.

The foregoing descriptions are merely implementations of embodiments, but are not intended to limit the scope of the embodiments. Any variation or replacement readily figured out by a person skilled in the art shall be within the scope of the embodiments.

What is claimed is:

1. An electronic mechanical brake system, comprising:
a brake pedal;
an electronic brake mechanism comprising a controller and an electronic signal sensor;
a mechanical brake mechanism comprising a transmission assembly and an actuator;
a brake; and
a switch mechanism; comprising a housing, a first sliding block, a double-sided ratchet, and an electromagnetic switch assembly, wherein the switch mechanism has a first state and a second state, the switch mechanism is in the first state when the electronic brake mechanism works properly, and the switch mechanism is in the second state when the electronic brake mechanism fails, the controller is electrically connected to the electronic signal sensor and the brake,
when the switch mechanism is in the first state, the electronic signal sensor is configured to receive a braking signal of the brake pedal and transmit the braking signal to the controller, and the controller is configured to control the brake to brake based on the braking signal;
when the switch mechanism is in the second state, the actuator is in transmission connection to the brake pedal by using the transmission assembly, and the actuator is connected to the brake and configured to control the brake to brake;
a first end of the first sliding block is connected to the brake pedal by using a connecting rod, the connecting rod is configured to drive the first sliding block to slide on the housing in a first direction, a second end of the first sliding block is connected to a first end of the double-sided ratchet, a first side of the double-sided ratchet is connected to a feedback mechanism, and a second side of the double-sided ratchet is connected to the transmission assembly; and
a first end of the electromagnetic switch assembly is disposed on the first sliding block, a second end of the electromagnetic switch assembly is disposed on the double-sided ratchet, and the electromagnetic switch assembly is configured to: connect the switch mechanism to the double-sided ratchet when the switch mechanism is in the first state, and connect the switch mechanism to the transmission assembly when the switch mechanism is in the second state.

2. The electronic mechanical brake system according to claim 1, further comprising:
a feedback mechanism, wherein when the switch mechanism is in the first state, the feedback mechanism is in transmission connection to the brake pedal, and the feedback mechanism is configured to provide reaction force for the brake pedal.

3. The electronic mechanical brake system according to claim 1, wherein the electromagnetic switch assembly further comprises:
a positioning block,
an electromagnet, and
a metal drive rod, the positioning block is fastened to the first sliding block, the electromagnet is connected to the positioning block, a gap exists between the electromagnet and the positioning block, a first end of the metal drive rod is located in the gap, a second end of the metal drive rod is connected to the first end of the double-sided ratchet, and when the switch mechanism is in the first state, the controller is configured to control a set current to pass through the electromagnet, so that the first end of the metal drive rod is connected to the electromagnet, and the second end of the metal drive rod drives the double-sided ratchet to connect to the feedback mechanism.

4. The electronic mechanical brake system according to claim 3, wherein the electromagnetic switch assembly further comprises:
a first elastic part, a first end of the first elastic part is connected to the first sliding block, a second end of the first elastic part is connected to the second side of the double-sided ratchet, and when the electronic brake mechanism fails, the first elastic part drives the switch mechanism to switch to the second state.

5. The electronic mechanical brake system according to claim 4, wherein the feedback mechanism further comprises:
a second rack,
a second gear, and
a second reel, the second reel and the second gear are connected to the housing by using a third rotating shaft, a first side of the second rack is connected to the second gear, and a second side of the second rack is connected to the first side of the double-sided ratchet.

6. The electronic mechanical brake system according to claim 1, wherein the brake further comprises:

a motor, a reducer, and a brake assembly, an output shaft of the motor is in transmission connection to the reducer, and an output shaft of the reducer is connected to the brake assembly; and the controller is electrically connected to the motor, and the actuator is connected to the output shaft of the reducer.

7. The electronic mechanical brake system according to claim 6, wherein the transmission assembly further comprises:

a first reel, a first gear, a first rack, and a cable, the first gear is fixedly disposed on the first reel, the first gear and the first reel are rotatably disposed on a housing by using a first rotating shaft, a first side of the first rack is engaged with the first gear, and a second side of the first rack is engaged with the second side of the double-sided ratchet, a first end of the cable is fastened to the first reel, a second end of the cable is connected to the actuator, and when the double-sided ratchet drives the first rack to move in the first direction, the first rack drives the first gear to rotate, so that the cable is coiled on the first reel.

8. The electronic mechanical brake system according to claim 6, wherein the actuator further comprises:

a fixed shell, a ratchet wheel, a drive plate, a second sliding block, and a second elastic part, the fixed shell is fastened to a side of the output shaft of the reducer, the ratchet wheel is connected to the output shaft of the reducer, a mounting channel is formed between the ratchet wheel and the fixed shell, the second sliding block is disposed in the mounting channel, a first end of the second sliding block is connected to a first end of the second elastic part, and a second end of the second elastic part is connected to the fixed shell, a first end of the drive plate is rotatably connected, by using a second rotating shaft, to the end of the second sliding block close to the second elastic part, a second end of the drive plate is away from the ratchet wheel, the second end of the drive plate is connected to a cable, and a third end of the drive plate faces the ratchet wheel and is provided with a ratchet for cooperating with the ratchet wheel.

9. The electronic mechanical brake system according to claim 8, wherein the actuator further comprises:

a third elastic part, a first end of the third elastic part is connected to the drive plate, a second end of the third elastic part is connected to the first end of the second sliding block, and the third elastic part is in contact with the second rotating shaft, so that the third elastic part is in a force accumulation state and provides force away from the ratchet wheel for the drive plate.

10. The electronic mechanical brake system according to claim 8, wherein the fixed shell has a position-limiting plate for the cable to pass through, the actuator further comprises:

a fourth elastic part, the fourth elastic part is located between a connection portion between the cable and the drive plate and a side of the position-limiting plate facing the drive plate, and the fourth elastic part is sleeved on the cable.

11. The electronic mechanical brake system according to claim 8, wherein the actuator further comprises:

a first ratchet disc, a second ratchet disc, and a fifth elastic part configured to connect the first ratchet disc to the second ratchet disc;

a flange is disposed on the second ratchet disc, the flange and the second ratchet disc are coaxially disposed, the flange protrudes from the second ratchet disc, the flange is connected to the output shaft of the reducer, the first ratchet disc is sleeved on the output shaft of the reducer, and the first ratchet disc and the second ratchet disc are connected by using a guide mechanism, the first ratchet disc is connected to the cable, and the cable is configured to:

when the switch mechanism is in the second state, pull the first ratchet disc to move, through the guide mechanism, to a position of the second ratchet disc, so that a first ratchet that is disposed on a side of the first ratchet disc and that faces the second ratchet disc cooperates with a second ratchet that is disposed on a side of the second ratchet disc and that faces the first ratchet disc, to drive the second ratchet disc to rotate.

12. The electronic mechanical brake system according to claim 11, wherein a through hole for the output shaft of the reducer to pass through is disposed on the first ratchet disc, a guide ball is disposed on an inner wall of the through hole, a spiral guide groove is disposed on a side wall of the flange, and the guide ball and the guide groove form the guide mechanism.

13. The electronic mechanical brake system according to claim 11, wherein a mounting ear is further disposed on the first ratchet disc, and an opening connected to the cable is disposed on the mounting ear.

14. A vehicle, comprising an electronic mechanical brake system, wherein the electronic mechanical brake system comprises:

a brake pedal;

an electronic brake mechanism comprising a controller and an electronic signal sensor;

a mechanical brake mechanism comprising a transmission assembly and an actuator;

a brake; and a switch mechanism comprising a housing, a first sliding block, a double-sided ratchet, and an electromagnetic switch assembly, wherein the switch mechanism has a first state and a second state, the switch mechanism is in the first state when the electronic brake mechanism works properly, and the switch mechanism is in the second state when the electronic brake mechanism fails, the controller is electrically connected to the electronic signal sensor and the brake, when the switch mechanism is in the first state, the electronic signal sensor is configured to receive a braking signal of the brake pedal and transmit the braking signal to the controller, and the controller is configured to control the brake to brake based on the braking signal;

when the switch mechanism is in the second state, the actuator is in transmission connection to the brake pedal by using the transmission assembly, and the actuator is connected to the brake and configured to control the brake to brake;

a first end of the first sliding block is connected to the brake pedal by using a connecting rod, the connecting rod is configured to drive the first sliding block to slide on the housing in a first direction, a second end of the first sliding block is connected to a first end of the double-sided ratchet, a first side of the double-sided ratchet is connected to a feedback mechanism, and a second side of the double-sided ratchet is connected to the transmission assembly; and a first end of the electromagnetic switch assembly is disposed on the first sliding block, a second end of the electromagnetic switch assembly is disposed on the double-sided ratchet, and the electromagnetic switch assembly is configured to: connect the switch mechanism to the double-sided ratchet when the switch mechanism is in the first state, and connect the switch mechanism to the transmission assembly when the switch mechanism is in the second state.

15. The vehicle according to claim 14, further comprising:
a feedback mechanism, wherein when the switch mechanism is in the first state, the feedback mechanism is in transmission connection to the brake pedal, and the feedback mechanism is configured to provide reaction force for the brake pedal.

16. The vehicle according to claim 14, wherein the electromagnetic switch assembly further comprises:
a positioning block,
an electromagnet, and
a metal drive rod, the positioning block is fastened to the first sliding block, the electromagnet is connected to the positioning block, a gap exists between the electromagnet and the positioning block, a first end of the metal drive rod is located in the gap, a second end of the metal drive rod is connected to the first end of the double-sided ratchet, and when the switch mechanism is in the first state, the controller is configured to control a set current to pass through the electromagnet, so that the first end of the metal drive rod is connected to the electromagnet, and the second end of the metal drive rod drives the double-sided ratchet to connect to the feedback mechanism.

17. The vehicle according to claim 16, wherein the electromagnetic switch assembly further comprises:
a first elastic part, a first end of the first elastic part is connected to the first sliding block, a second end of the first elastic part is connected to the second side of the double-sided ratchet, and when the electronic brake mechanism fails, the first elastic part drives the switch mechanism to switch to the second state.

18. The vehicle according to claim 14, wherein the brake further comprises:
a motor,
a reducer, and
a brake assembly, an output shaft of the motor is in transmission connection to the reducer, and an output shaft of the reducer is connected to the brake assembly, the controller is electrically connected to the motor, and the actuator is connected to the output shaft of the reducer.

* * * * *